(12) United States Patent
Dietl et al.

(10) Patent No.: US 7,890,762 B2
(45) Date of Patent: Feb. 15, 2011

(54) DIFFERENTIATED PROXY DIGITAL SIGNATURES

(75) Inventors: Josef Dietl, Nussloch (DE); Theo Verlaan, Wissloch (DE)

(73) Assignee: SAP AG, Walldorf, DE (US)

( * ) Notice: Subject to any disclaimer, the term of this patent is extended or adjusted under 35 U.S.C. 154(b) by 980 days.

(21) Appl. No.: 11/026,559

(22) Filed: Dec. 30, 2004

(65) Prior Publication Data

US 2006/0156006 A1 Jul. 13, 2006

(51) Int. Cl.
*H04L 9/00* (2006.01)
(52) U.S. Cl. ............... 713/176; 713/180; 713/160; 713/177; 713/168; 380/255
(58) Field of Classification Search ............ 713/176
See application file for complete search history.

(56) References Cited

U.S. PATENT DOCUMENTS

| | | | | |
|---|---|---|---|---|
| 5,001,752 A * | 3/1991 | Fischer | ............... | 713/178 |
| 5,734,752 A * | 3/1998 | Knox | ............... | 358/3.28 |
| 5,850,346 A * | 12/1998 | Barrus | ............... | 708/495 |
| 6,107,913 A * | 8/2000 | Gatto et al. | ............... | 340/323 R |
| 6,209,090 B1 * | 3/2001 | Aisenberg et al. | ............... | 713/178 |
| 6,307,955 B1 * | 10/2001 | Zank et al. | ............... | 382/121 |
| 6,398,245 B1 * | 6/2002 | Gruse et al. | ............... | 280/228 |
| 6,785,815 B1 * | 8/2004 | Serret-Avila et al. | ............... | 713/176 |
| 7,197,143 B2 * | 3/2007 | Duerr et al. | ............... | 380/229 |
| 2002/0029337 A1 * | 3/2002 | Sudia et al. | ............... | 713/176 |
| 2002/0053021 A1 * | 5/2002 | Rice et al. | ............... | 713/155 |
| 2002/0104004 A1 * | 8/2002 | Couillard | ............... | 713/178 |
| 2002/0138735 A1 * | 9/2002 | Felt et al. | ............... | 713/176 |
| 2003/0056104 A1 * | 3/2003 | Carr et al. | ............... | 713/176 |
| 2003/0131241 A1 * | 7/2003 | Gladney | ............... | 713/176 |
| 2004/0117726 A1 * | 6/2004 | Inada et al. | ............... | 715/500 |
| 2004/0158717 A1 * | 8/2004 | Cox | ............... | 713/176 |
| 2005/0005126 A1 * | 1/2005 | Zhang et al. | ............... | 713/176 |
| 2006/0004662 A1 * | 1/2006 | Nadalin et al. | ............... | 705/50 |
| 2006/0156005 A1 * | 7/2006 | Fischer et al. | ............... | 713/176 |
| 2006/0259783 A1 * | 11/2006 | Work et al. | ............... | 713/189 |
| 2006/0271787 A1 * | 11/2006 | DeYoung et al. | ............... | 713/176 |
| 2007/0033168 A1 * | 2/2007 | Minogue et al. | ............... | 707/3 |
| 2009/0287697 A1 * | 11/2009 | Minogue et al. | ............... | 707/5 |

OTHER PUBLICATIONS

Security Analysis of Some Proxy Signatures, http://www.springerlink.com/content/rw6h7vkhrx3872ty/, Guilin Wang et al., May 12, 2004.*
"Security Analysis of some proxy signatures", Guilin Wang et al., 2003.*

* cited by examiner

*Primary Examiner*—Kambiz Zand
*Assistant Examiner*—Yonas Bayou
(74) *Attorney, Agent, or Firm*—Fountainhead Law Group P.C.

(57) ABSTRACT

Methods and apparatus, including computer program products, for providing input to a workflow application. Source documents are received that have respective original signatures but no digital signatures. The source documents can be paper documents, or they can be scanned representations of paper documents. Proxy digital signatures are applied to digital representations of the source documents. The proxy digital signatures are differentiated in that they are annotated with metadata indicating the quality of the respective original signatures.

21 Claims, 1 Drawing Sheet

DIFFERENTIATED PROXY DIGITAL SIGNATURES

BACKGROUND

The present invention generally relates to digital data processing and more particularly to workflows involving signed documents.

It is a common goal for businesses to execute as many of business processes in a digital form as possible. In order to secure these processes, the use of digital signatures is a common practice. However, it is not always practical to use digital signatures. For example, external partners may not be able to produce documents with digital signatures in the required form. It can also be very difficult, especially in a large organization, to establish a certification infrastructure so that digital signatures can be used effectively everywhere within the organization.

SUMMARY OF THE INVENTION

The present invention provides methods and apparatus, including computer program products, that implement techniques for integrating normal paper signatures into computer-implemented workflows secured by digital signatures.

In one aspect, the invention provides methods and apparatus, including computer program products, for providing input to a workflow application. Source documents are received that can have respective original signatures but are not digitally signed. The source documents can be paper documents, or they can be scanned representations of paper documents. Proxy digital signatures are applied to digital representations of the source documents. The proxy digital signatures are differentiated in that they are annotated with metadata indicating the quality of the respective original signatures.

In particular implementations, one or more of the following features can be found. The digital representations of the source documents comprise text representations. The digital representations of the source documents comprise image representations. The non-digital source documents are digitized. The method metadata for a particular digital representation indicates whether or not the corresponding source document was a paper document having an original signature that was verified by a person applying the proxy digital signature to the corresponding source document. The metadata for a particular digital representation indicates whether or not the corresponding source document was a paper document having an original signature that was not verified by a person applying the proxy digital signature to the corresponding source document. The metadata for a particular digital representation indicates whether or not the corresponding source document was a paper document having no original signature. The signed digital representations of the source documents with proxy digital signatures and metadata are provided to a workflow application as input documents.

Details of one or more implementations of the invention are set forth in the accompanying drawings and in the description below. Further features, aspects, and advantages of the invention will become apparent from the description, the drawings, and the claims.

DETAILED DESCRIPTION

Figure 1:
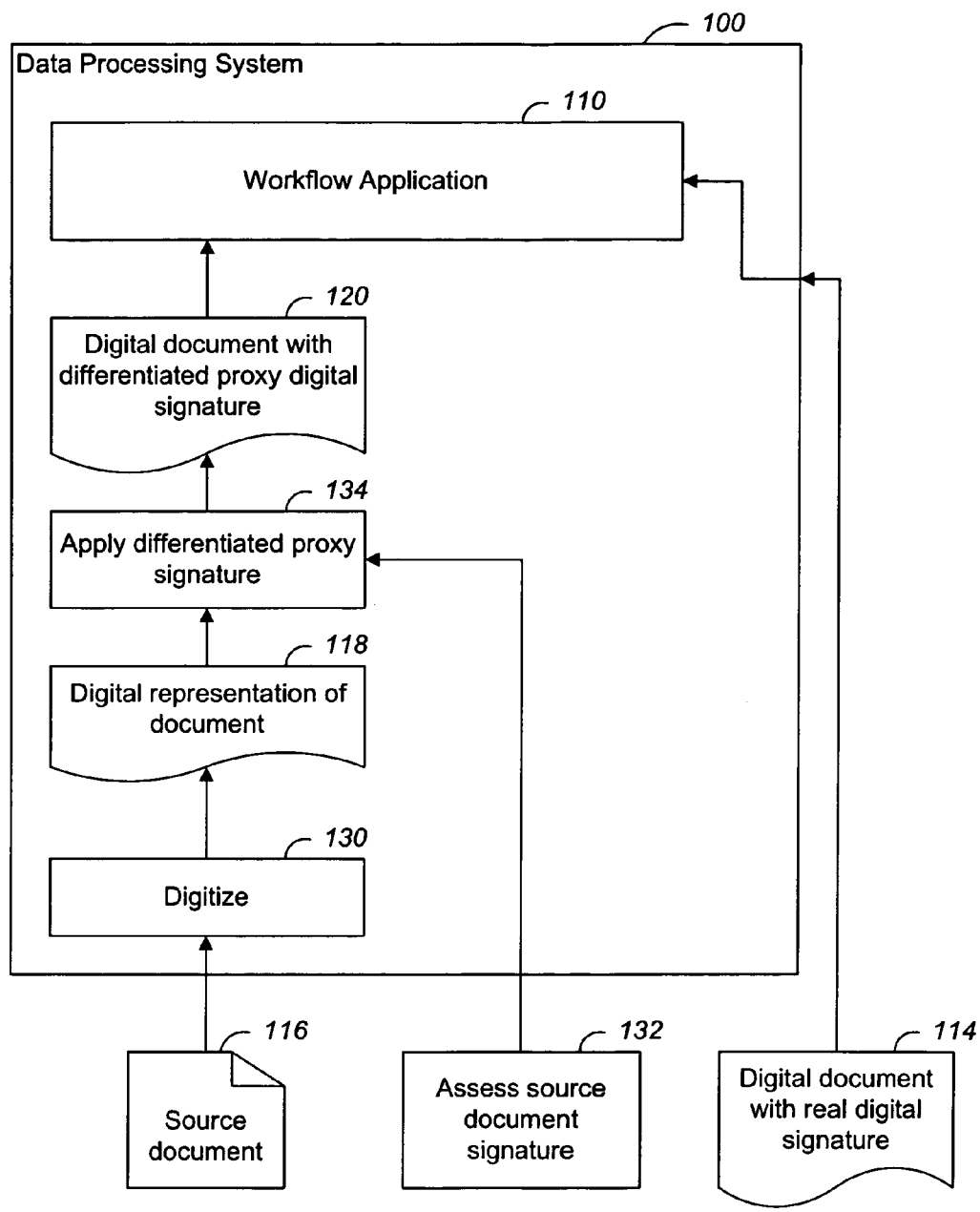
FIG. 1 is a block diagram of an implementation of the invention and operations relating to it.

FIG. 1 illustrates a data processing system 100 that is running a workflow application 110. The data processing system 100 can be implemented on one or more computers in a local or distributed configuration. The data processing system 100 and the workflow application 110 can be implemented in a client-server architecture, with users interacting with the system and application through client computers, e.g., personal computers or mobile personal digital assistants.

The workflow application 110 performs one or more business processes in a digital form taking signed digital documents 114 as input. The use of digital signatures on the documents provides security for the processes. However, and especially when a digital workflow is being introduced, not all potential participants may be able to produce documents with digital signatures, or to produce digital signatures that can be accepted by the workflow application 110.

The present invention solves this problem by introducing proxy digital signatures. These proxy signatures do not individually stand for either the authenticity or the integrity of the document content as such, but only for the correspondence of a digital representation of the document 118 to its source document 116 and to the presence of an actual signature on the source document 116.

The original source document 116 can be digitized (130) for handling by the system 100 in a number of ways. For example, documents can be entered by a typist or scanned by a scanner operator. Scanned documents can be processed into text form by an optical character reader (OCR) program or process, which can optionally involve a human operator to provide correction or confirmation of the resulting digital text. Optionally, the original source document can exist in, or be provided to, the system 100 in digital form, but without a digital signature sufficient for the security requirements of the workflow application 110.

For example, the original source document can be one or more records in a database and a printed paper document that was generated from those records. In one scenario based on this example, a salesman updates an order database with order information and prints an order document for a customer, the customer then signs the generated order document, and the salesman returns the signed order for processing. Assessing the actual signature (132), described below, then would include confirming that the signed paper order corresponds to the data from which it was generated.

In order to avoid confusion between proxy signatures and real digital signatures, i.e., signatures applied to the document by a person or system signing on his or its own behalf, the signature block of at least a proxy digital signature is annotated with suitable metadata to differentiate the kinds of digital signatures that will appear on documents entering the workflow application 110.

The kinds of digital signatures that are differentiated, and distinguished by metadata, can include the following kinds.

1. Original digital signatures. These are non proxy digital signatures. This kind can be assumed if no metadata is present.

2. Verified paper signature. In a freshly created digital representation, the signature of the paper original was verified by a person based on a signature sample.

3. Verified image signature. The signature in a digital image representation was verified based on a signature sample.

4. Unverified paper signature present. In a freshly created digital representation, the presence of a signature, but not the signature itself, was verified by a person.

5. Unverified image signature present. The presence of a signature in a digital image representation, but not the signature itself, was verified by a person.

6. Unsigned. The original was not signed. This can be assumed if no digital signature present.

Thus, to support a secure workflow, the proxy digital signature will cover both the document itself—generally in the form of a hash of the document—and the metadata describing the kind of proxy digital signature that has been applied.

Assessing the source document signature (132)—i.e., determining whether an original signature is present, and if so, whether it matches a sample signature—is done by a person who provides the information to a program running on the system 100. This person signs (134) the digital representation 118 of the document with a proxy digital signature that is annotated with metadata identifying the kind of signature and the nature of the verification that was done with respect to the original signature, if any, on the source document. In this way, a digital document with a differentiated proxy signature 120 is produced.

Digital documents with differentiated proxy signatures 120 can then be submitted as an input documents to the workflow application 110, just as digital documents 114 with real digital signatures are submitted. The workflow application 110 can then accept, reject, or give special handling to each document with a proxy signature based on the quality of the signature attached to it, as indicated by the proxy signature metadata.

Such signed documents can exist in a number of forms. For example, a digital document and its differentiated proxy signature can be stored as a record in a database with the signature being attached to the document and part of the same record. As another example, a database can have one column for documents and a parallel column for corresponding signatures. As a further example, a database can a first table for document contents and a second table for descriptive information with a key that links descriptive information to documents, and the digital signature can be stored as one item of information stored in the second table. As a final example, a unique identifier (e.g., a properly constructed Uniform Resource Locator (URL), Uniform Resource Name (URN), Uniform Resource Identifier (URI), or Internationalized Resource Identifier (IRI)) can be assigned to the document and the differentiated proxy signature can be attached to the document by including the unique identifier in the data covered by the proxy digital signature, so that the signature in effect points to the signed document.

The use of such proxy signatures can facilitate the roll-out of digital-signature based systems, allowing digital-signature based work processes to be established inside a company where only parts of the company are attached to the certification infrastructure (e.g., for geographically detached parts, separate departments, or staged roll-outs). The use of such proxy signatures can also facilitate cross-organization, digital-signature-based workflows where some of the partners involved are not (yet) part of the certificate authority network, as well as workflows involving individual customers who are not part of the certificate authority network. The use of such proxy signatures can also be used to increase reliability in CRM (customer relationship management) operations because the employees entering documents into the CRM system are firmly attached to their documents through the proxy digital signatures that they apply.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or non-transitory information carrier, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers located at one site or distributed across multiple sites and interconnected, permanently or intermittently, by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. A computer can be embedded in another device, e.g., in a digital appliance, for example, a mobile telephone or a personal digital assistant, to name just a few. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, output provided to the user can be in any sensory form, e.g., visual, auditory, or tactile output; and input from the user can be received in any form, including acoustic, speech, or tactile input.

The invention can be implemented in a computing system that includes a back-end component (e.g., a data server), a middleware component (e.g., an application server), or a front-end component (e.g., a client computer having a graphical user interface or a web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims.

What is claimed is:

1. A computer program product for providing input to a workflow application, embodied on non-transitory information carrier, operable to cause a data process apparatus to perform the operations off
   receiving source documents, the source documents having respective original signatures but no digital signatures; and signatures, and wherein the source documents comprise paper documents;
   digitizing the source documents to generate digital representations of the source documents, wherein the digital representations of the source documents include the respective original signatures represented digitally but no digital signatures; and
   applying differentiated proxy digital signatures to the digital representations of the source documents, the differentiated proxy digital signatures being annotated with metadata indicating the quality of the respective original signatures, the differentiated proxy digital signatures indicating the digital representation of the source documents corresponds to the source documents, and further indicating an actual signature is present on the source documents.

2. The product of claim 1, wherein the digital representations of the source documents comprise text representations.

3. The product of claim 1, wherein the digital representations of the source documents comprise image representations.

4. The product of claim 1, wherein:
   the metadata for a particular digital representation indicates whether or not the corresponding source document was a paper document having an original signature that was verified by a person applying the differentiated proxy digital signature to the corresponding source document.

5. The product of claim 1, wherein:
   the metadata for a particular digital representation indicates whether or not the corresponding source document was a paper document having an original signature that was not verified by a person applying the differentiated proxy digital signature to the corresponding source document.

6. The product of claim 1, wherein:
   the metadata for a particular digital representation indicates whether or not the corresponding source document was a paper document having no original signature.

7. The product of claim 1, further operable to cause a data process apparatus to perform the operation of:
   providing the signed digital representations of the source documents with differentiated proxy digital signatures and metadata to a workflow application as input documents.

8. A method, implemented by a data processing system, of providing input to a workflow application, comprising:
   receiving a source document having an original signature but no digital signature, and wherein the source document comprises a paper document;
   digitizing, by the data processing system, the source document to generate a digital representation of the source document; document, wherein the digital representation of the source document includes the original signature represented digitally but no digital signature;
   assessing, by a user, a correspondence of the digital representation to the source document; and
   signing, by the data processing system in response to the assessing by the user, the digital representation with a differentiated proxy digital signature, wherein the differentiated proxy digital signature stands for the correspondence of the digital representation to the source document and to a presence of the original signature on the source document,
   wherein the differentiated proxy digital signature does not stand for an authenticity and an integrity of the source document,
   wherein the differentiated proxy digital signature is annotated with metadata indicating the quality of the original signature, and
   wherein the differentiated proxy digital signature indicates the digital representation corresponds to the source document, and further indicates the original signature is actually present on the source document.

9. The method of claim 8, wherein the digital representation of the source document comprises a text representation.

10. The method of claim 8, wherein the digital representation of the source documents comprises an image representation.

11. The method of claim 8, wherein:
    the metadata for the digital representation indicates whether or not the source document was a paper document having the original signature that was verified by the user applying the differentiated proxy digital signature to the source document.

12. The method of claim 8, wherein:
    the metadata for the digital representation indicates whether or not the source document was a paper document having the original signature that was not verified by the user applying the differentiated proxy digital signature to the source document.

13. The method of claim 8, wherein:
    the metadata for the digital representation indicates whether or not the source document was a paper document having no original signature.

14. The method of claim 8, further comprising:
    providing the digital representation signed with the differentiated proxy digital signature and the metadata to the workflow application as input documents.

15. A data processing system that is configured to provide input to a workflow application, comprising:
    a digitizer that is configured to receive a source document having an original signature but no digital signature, and that is configured to generate a digital representation of the source document, wherein the source document comprises a paper document, and wherein the digital representation of the source document includes the original signature represented digitally but no digital signature;

a user interface that is configured to receive, from a user, a correspondence of the digital representation to the source document; and a digital signature generator that is configured to sign, in response to receiving the correspondence, the digital representation with a differentiated proxy digital signature, wherein the differentiated proxy digital signature stands for the correspondence of the digital representation to the source document and to a presence of the original signature on the source document, wherein the differentiated proxy digital signature does not stand for an authenticity and an integrity of the source document, wherein the differentiated proxy digital signature is annotated with metadata indicating the quality of the original signature, and wherein the differentiated proxy digital signature indicates the digital representation corresponds to the source document, and further indicates the original signature is actually present on the source document.

16. The data processing system of claim 15, wherein the digital representations of the source documents comprise text representations.

17. The data processing system of claim 15, wherein the digital representations of the source documents comprise image representations.

18. The data processing system of claim 15, wherein:

the metadata for the digital representation indicates whether or not the source document was a paper document having an original signature that was verified by a person applying the differentiated proxy digital signature to the source document.

19. The data processing system of claim 15, wherein:

the metadata for the digital representation indicates whether or not the source document was a paper document having an original signature that was not verified by a person applying the differentiated proxy digital signature to the source document.

20. The data processing system of claim 15, wherein:

the metadata for the digital representation indicates whether or not the source document was a paper document having no original signature.

21. The data processing system of claim 15, further comprising:

an interface to the workflow application that is configured to provide the digital representation signed with the differentiated proxy digital signature and the metadata to the workflow application as input documents.

* * * * *